United States Patent [19]

Bessho

[11] Patent Number: 5,075,895
[45] Date of Patent: Dec. 24, 1991

[54] METHOD AND APPARATUS FOR RECOGNIZING TABLE AREA FORMED IN BINARY IMAGE OF DOCUMENT

[75] Inventor: Goroh Bessho, Tokyo, Japan

[73] Assignee: Ricoh Company, Ltd., Japan

[21] Appl. No.: 501,805

[22] Filed: Mar. 30, 1990

[30] Foreign Application Priority Data

Apr. 5, 1989 [JP] Japan .................................. 1-86062

[51] Int. Cl.$^5$ .............................................. G06K 9/20
[52] U.S. Cl. ...................................... 382/61; 358/453; 358/462; 382/9
[58] Field of Search .................... 382/61, 9, 57, 24, 54; 358/452, 453, 450, 462

[56] References Cited

U.S. PATENT DOCUMENTS

| | | | |
|---|---|---|---|
| 4,428,077 | 1/1984 | Shimada et al. | 382/9 |
| 4,504,969 | 3/1985 | Suzuki et al. | 382/61 |
| 4,516,265 | 5/1985 | Kizu et al. | 382/9 |
| 4,589,144 | 5/1986 | Namba | 382/9 |
| 4,811,412 | 3/1989 | Katsurada | 382/9 |
| 4,827,330 | 5/1989 | Walsh et al. | 382/61 |
| 4,901,365 | 2/1990 | Kelland | 382/61 |
| 4,949,392 | 8/1990 | Barski et al. | 382/61 |

FOREIGN PATENT DOCUMENTS 57-104363  6/1982  Japan .

Primary Examiner—David K. Moore
Assistant Examiner—Joseph Mancuso
Attorney, Agent, or Firm—Mason, Fenwick & Lawrence

[57] ABSTRACT

A method for recognizing a table area in a document, includes the steps of extracting image data on a table area having a table from binary image data on a document, extracting a line segment extending in a first direction from the image data on the table area, and extracting a line segment extending in a second direction perpendicular to the first direction from the image data on the table area. The method also includes the steps of determining, from the line segment extending in the first direction and the line segment extending in the second direction, whether or not ruled lines are provided on both sides of the table, and generating imaginary ruled lines on both sides of the table when it is determined that the ruled lines are provided on neither side of the table. An apparatus for recognizing a table area in a document is provided.

14 Claims, 3 Drawing Sheets

METHOD AND APPARATUS FOR RECOGNIZING TABLE AREA FORMED IN BINARY IMAGE OF DOCUMENT

BACKGROUND OF THE INVENTION

The present invention generally relates to a method and apparatus for recognizing a table area formed in a binary image of a document. The present invention is suitably applied to a character recognition apparatus.

A character recognition apparatus processes a binary image of a document which is scanned. A binary image can be classified into a character area, a photograph/graphics area and a table area, for example. In some character recognition apparatus, different image processes are executed for different types of areas. For example, a process for a table area includes the steps of segmenting images within a table into parts by using coordinates of ruled lines and recognizing characters included in the parts. Various character recognition methods have been proposed. For example, Japanese Laid-Open Patent Application No. 57-104363 discloses a pattern recognizing method in which each pixel unit in a binary image is scanned and a line extending in a main scanning direction or a sub scanning direction is detected.

However, the method proposed in the above-mentioned Japanese application is directed to a table which has frames, each frame surrounded by ruled lines. In actuality, there are many tables which do not have ruled lines on all the sides thereof. For example, there is a table which does not have ruled lines on both sides thereof. The method proposed in the above Japanese application cannot extract the frames of such a table. This means that tables such as the above are not handled as table areas.

SUMMARY OF THE INVENTION

It is a general object of the present invention to provide an improved method and apparatus for recognizing a table area in which the aforementioned disadvantages are eliminated.

A more specific object of the present invention is to provide a method and apparatus capable of recognizing a table area having no ruled lines on both sides thereof.

The above-mentioned objects of the present invention are achieved by a method for recognizing a table area in a document, comprising the steps of:
(a) extracting image data relating to a table area having a table from binary image data on a document;
(b) extracting a line segment extending in a first direction from the image data on the table area;
(c) extracting a line segment extending in a second direction perpendicular to the first direction from the image data on the table area;
(d) determining, from the line segment extending in the first direction and the line segment extending in the second direction, whether or not ruled lines are provided on both sides of the table; and
(e) generating imaginary ruled lines on both sides of the table when it is determined that the ruled lines are provided on neither side of the table.

The aforementioned objects of the present invention are also achieved by an apparatus for recognizing a table area in a document, comprising:

first means for extracting image data on a table area having a table from binary image data on a document;
second means, coupled to the first means, for extracting a line segment extending in a first direction from the image data on the table area;
third means, coupled to the first means, for extracting a line segment extending in a second direction perpendicular to the first direction from the image data on the table area;
fourth means, coupled to the second and third means, for determining, from the line segment extending in the first direction and the line segment extending in the second direction, whether or not ruled lines are provided on both sides of the table; and
fifth means, coupled to the second, third and fourth means, for generating imaginary ruled lines on both sides of the table when it is determined that the ruled lines are provided on neither side of the table.

Further objects, features and advantages of the present invention will become apparent from the following detailed description when read in conjunction with the accompanying drawings.

DESCRIPTION OF THE PREFERRED EMBODIMENT

Figure 1:
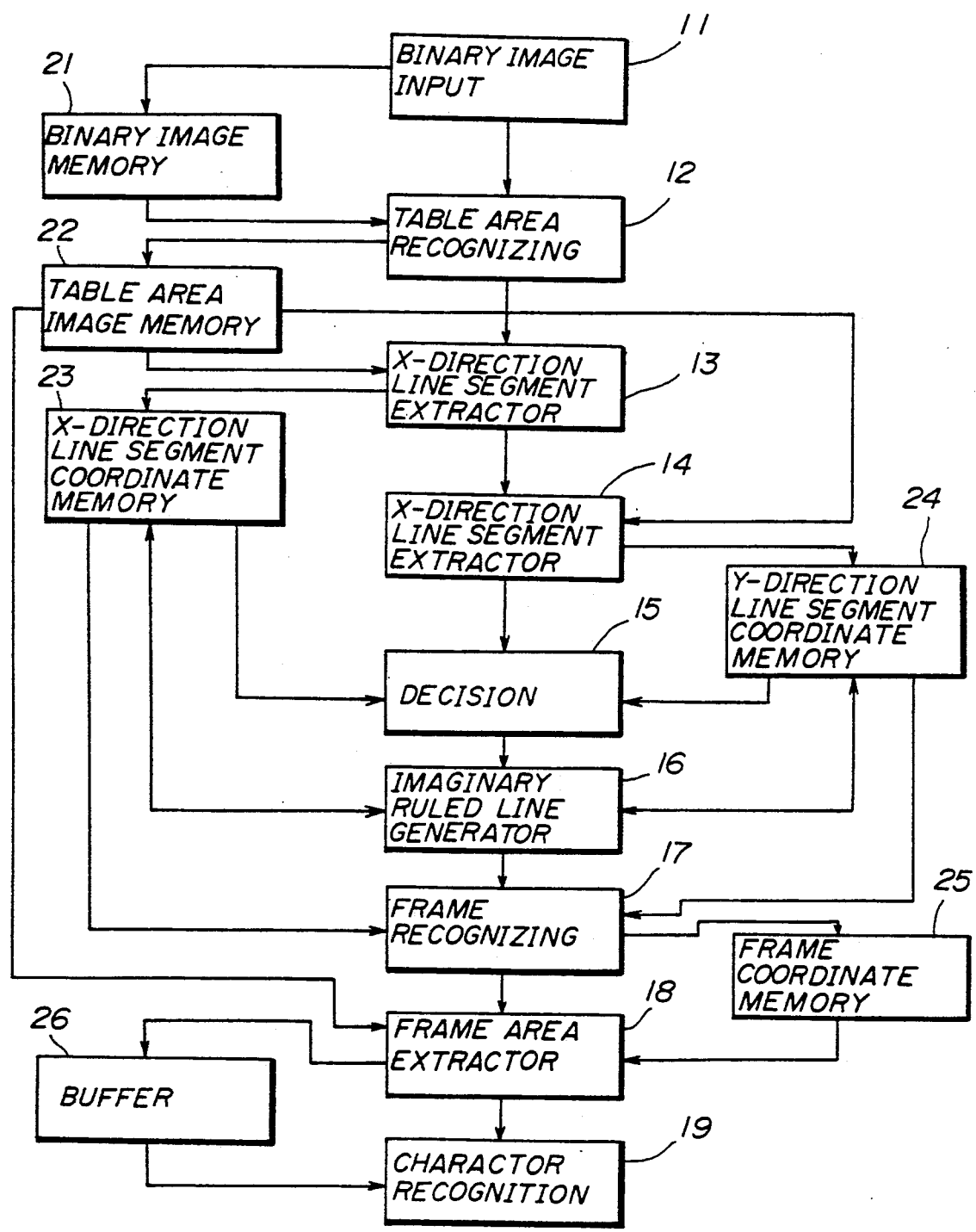
FIG. 1 is a block diagram of an apparatus according to a preferred embodiment of the present invention.
Figure 2:
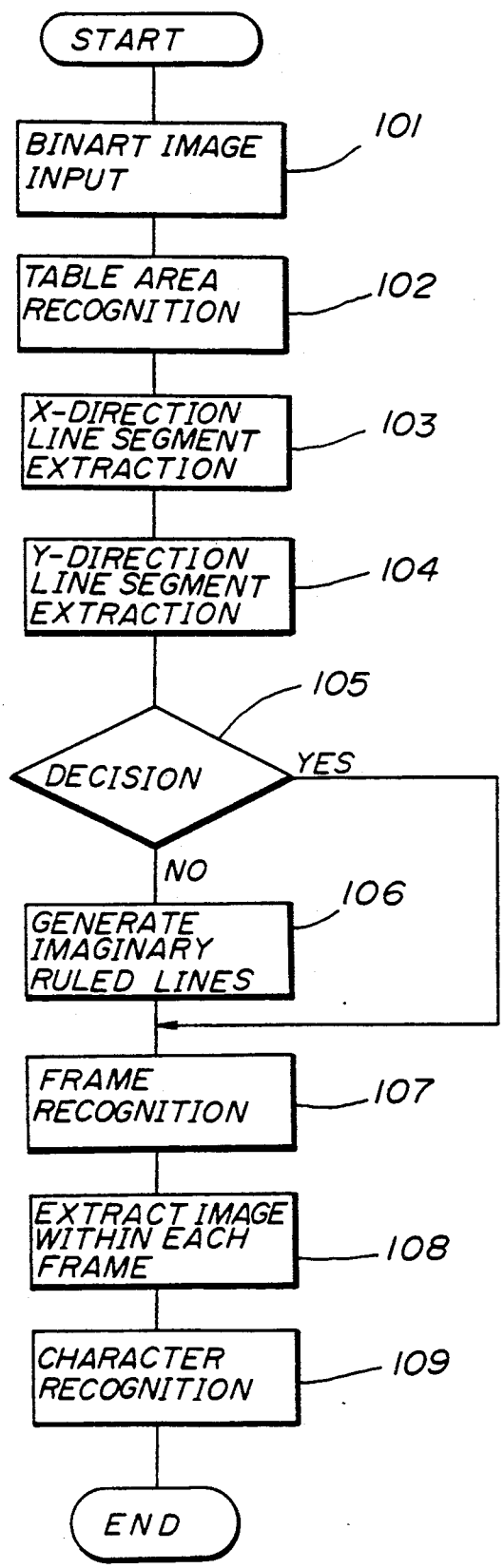
FIG. 2 is a flowchart illustrating the operation of the apparatus shown in FIG.1.
Figure 3:
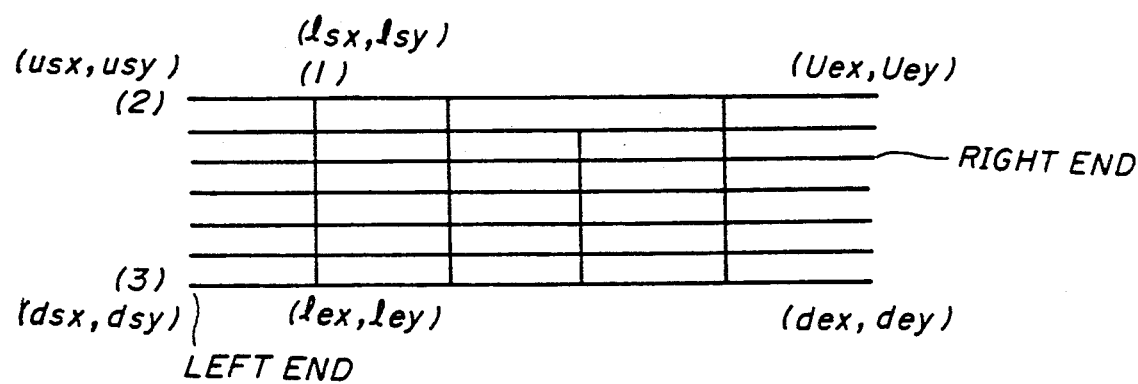
FIG. 3 is a diagram illustrating a table which does not have ruled lines on either side thereof.

A description is given of a preferred embodiment of the present invention with reference to FIGS. 1 through 3. Referring to FIG. 1 first, a binary image input device 11 includes a scanner, for example, and optically reads a document and outputs an electrical binary image signal. For example, a document has a predetermined format which defines a character area, a photograph/graphics area and a table area. A binary image memory 21 stores the binary image signal from the binary image input device 11. A two-dimensional binary image is formed by the binary image signal. A table area recognizing block 12 recognizes a table area in a binary image represented by the binary image signal which is read out from the binary image memory 21 or supplied directly from the binary image input device 11. Data relating to the recognized table area is stored in a table area image memory 22. For example, data in a table area defined by the predetermined format is extracted from the binary image signal. Alternatively, it is possible to designate a table area by using a mouse. A conventional procedure for recognizing a table area may also be employed.

An X-direction line segment extracting block 13 extracts a line segment extending in an X direction from an image formed in the table area. A line segment has a length equal to or greater than a predetermined length. Data indicating coordinates related to the extracted line segment in the X direction is stored in an X-direction line segment coordinate memory 23. A Y-direction line segment extracting block 14 extracts a line segment extending in a Y direction from the image formed in the table area. Data indicating coordinates related to the extracted line segment in the Y direction is stored in a Y-direction line segment coordinate memory 24. A decision circuit 15 determines whether there are ruled lines on both sides of the table being processed by using data read out from the X-direction line segment coordinate memory 23 and the Y-direction line segment coordinate memory 24. The result of the decision is supplied to an imaginary ruled line generator 16. When it is determined that the table being processed does not have ruled lines on both sides thereof, the imaginary ruled line generator 16 derives imaginary ruled lines from data stored in the X-direction line segment coordinate memory 23 and the Y-direction line segment coordinate memory 24. The procedure for generating imaginary ruled lines will be described in detail later.

A frame recognizing block 17 recognizes a frame of the table being processed from data related on segment lines from the memories 23 and 24 by referring to the imaginary ruled lines derived from the imaginary ruled line generator 16, and writes coordinate data on the recognized frame into a frame coordinate memory 25. A frame is an area surrounded by real ruled lines or a combination of real ruled lines and an imaginary ruled line. A frame area extractor 18 extracts a binary image within each frame of the table area defined by the data stored in the table area image memory 22 on the basis of coordinate data on the frame stored in the frame coordinate memory 25. The extracted binary image is sent directly or via a buffer memory 26 to a character recognizing block 19. The character recognizing block 19 recognizes the binary image in a conventional manner.

A description will now be given of the operation of the apparatus with reference to FIG. 2. At step 101, a document is optically read by the binary image input device 11 and a corresponding electrical binary image data is stored in the binary image memory 21. At step 102, a table area of the binary image is recognized by the table area recognizing block 12, and image data on the table area is stored in the table area image memory 22. It is also possible for the operator to designate a table area by means of the mouse. At step 103, the image data on the table area is processed by the X-direction line segment extractor 13 so that a series of black pixels extending in the X direction is detected. Coordinate data on the starting address and end address of each line segment in the X direction is stored in the X-direction line segment coordinate memory 23. At step 104, the image data on the table area is also processed by the Y-direction line segment extractor 14 so that a series of black pixels in the Y direction is detected. Coordinate data on the starting address and end address of each line segment in the Y direction is stored in the Y-direction line segment coordinate memory 24.

At step 105, the decision circuit 15 processes coordinate data on the memories 23 and 24 so that it detects the X-coordinate value of the starting point (or end point) of the Y-direction line segment which is closest to the left side of the table area (or right side) and the X-coordinate value of the starting point (or end point) of the X-direction line segment which is closest to the upper side thereof (or lower side). Then the decision circuit 15 determines, from the X-coordinate values, whether the table being considered has ruled lines on both sides thereof. For example, it is determined whether the following relationship is satisfied:

$$|l_{sx} - u_{sx}| \geq Th$$

-continued
$$|l_{ex} - d_{ex}| \geq Th$$

where $(\lambda sx, \lambda sy)$ and $(\lambda ex, \lambda ey)$ are, respectively, the coordinates of the starting and end points of Y-direction line segment (1), which is closest to the left side of the table area shown in FIG. 3, $(u_{sx}, u_{sy})$ are the coordinates of the starting point of X-direction line segment (2) on the uppermost side of the table area, $(d_{sx}, d_{sy})$ are the coordinates of the starting point of X-direction line segment (3) on the lowermost side of the table area, and Th is a constant. When the above formulas are both satisfied, it is determined that ruled lines are not present on both sides of the table being processed.

At step 106, the imaginary ruled line generator 16 generates two imaginary ruled lines (Y-direction line segments) on both sides thereof. Then, data about the coordinates of each of the two imaginary ruled lines is written into the X-direction line segment memory 23 and the Y-direction line segment memory 24. In the case shown in FIG. 3, the imaginary ruled line which is closed to the left side of the table has the coordinates $(Min(u_{sx}, d_{sx}), u_{sy})$ indicating the starting point thereof and the coordinates $(Max(u_{sx}, d_{sx}), d_{sy})$ indicating the end point thereof. It is noted that $Min(u_{sx}, d_{sx})$ indicates that the smaller of the coordinates $u_{sx}$ and $d_{sx}$ is selected. The other imaginary ruled line which is closed to the right side of the table area has the coordinates $(Min(u_{ex}, d_{ex}), u_{ey})$ indicating the starting point thereof and the coordinates $(Max(u_{ex}, d_{ex}), d_{ey})$ indicating the end point thereof where $Max(u_{ex}, d_{ex})$ indicates that the greater of the coordinates $u_{ex}$ and $d_{ex}$ is selected. The above-mentioned process is not carried out for a table which is determined to have ruled lines on both sides thereof.

At step 107, the frame recognizing block 17 recognizes a frame on the basis of the combination of the contents of the X- and Y-direction line segment coordinates memories 23 and 24 without paying attention to whether ruled lines are present on both sides thereof. In the case shown in FIG. 3, a plurality of frames are recognized.

At step 108, image data from the table area image memory 22 is segmented into frames which are recognized by the frame recognizing block 17. Then an image is extracted from data within each frame by the frame area extracting block 18. At step 109, an image within each frame is recognized by the character recognizing block 19 so that a character is identified.

Figure 4:
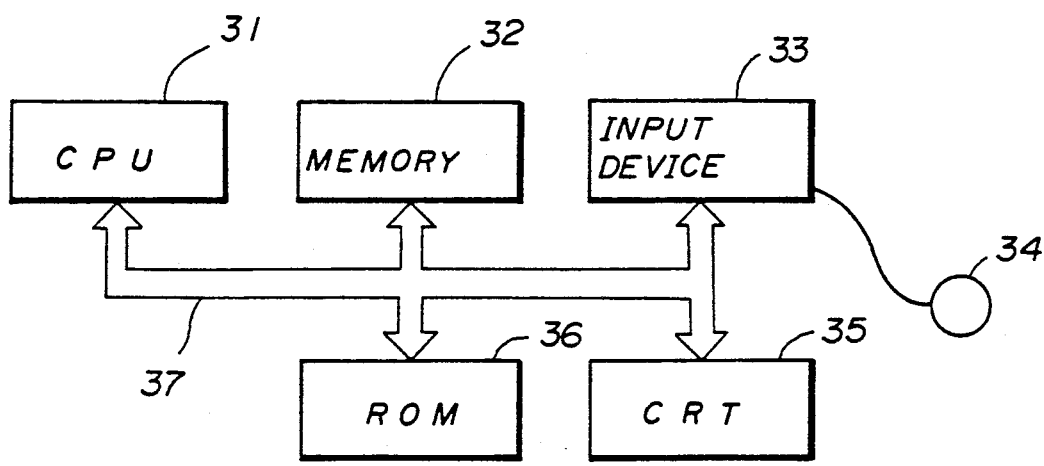
FIG. 4 is a block diagram illustrating the hardware structure of the embodiment of the present invention.

FIG. 4 is a block diagram of the hardware structure of the embodiment of the present invention. The hardware structure in FIG. 4 is made up of a central processing unit (CPU) 31, a memory 32 such as a random access memory, an input device 33 such as a keyboard, a mouse 34, a cathode-ray tube (CRT) device 35 and a read only memory (ROM) 36. These elements are coupled to a bus 37. A program which defines the procedure shown in FIG. 2 is stored in the ROM 36. Other programs for controlling the operation of the CPU 31 are stored in the ROM 36. The memory 32 includes the various memories shown in FIG. 1. The blocks shown in FIG. 1 other than the memories are realized by the CPU 31.

The present invention is not limited to the aforementioned embodiment, and variations and modifications may be made without departing from the scope of the present invention.

What is claimed is:

1. A method for recognizing a table area in a document, comprising the steps of:
   (a) extracting image data on a table area having a table from binary image data on a document;
   (b) extracting, from said image data on the table area, a line segment extending a first direction;
   (c) extracting, from said image data on the table area, a line segment extending in a second direction perpendicular to said first direction;
   (d) determining, from said line segment extending in the first direction and aid line segment extending in the second direction, whether or not ruled lines are provided on both sides of said table; and
   (e) generating imaginary ruled lines on both sides of said table when it is determined that the ruled lines are provided on either side of said table.

2. A method as claimed in claim 1, wherein said document has a predetermined format which defines said table area.

3. A method for recognizing a table area in a document, comprising the steps of:
   (a) extracting image data on a table area having a table from binary image data on a document;
   (b) extracting, from said image data on the table area, a line segment extending in a first direction;
   (c) extracting, from said image data on the table area, a line segment extending in a second direction perpendicular to said first direction;
   (d) determining, from said line segment extending in the first direction and said line segment extending in the second direction, whether or not ruled lines are provided on both sides of said table; and
   (e) generating imaginary ruled lines on both sides of said table when it is determined that the ruled lines are provided on neither side of said table;
   wherein said step (d) comprises the steps of:
   (1) determining whether $|\lambda_{sx}-u_{sx}| \geq Th$; and
   (2) determining whether $|\lambda_{ex}-d_{ex}| \geq Th$; satisfied,
   wherein:
   $(\lambda_{sx},\lambda_{sy})$ and $(\lambda_{ex},\lambda_{ey})$ are, respectively, coordinates of starting and end points of said line segment extending in the second direction and being positioned closes to a left side of said table;
   $(u_{sx},u_{sy})$ are coordinates of a starting point of said line segment extending in the first direction and being positioned on an uppermost side of said table;
   $(d_{sx},d_{sy})$ are the coordinate of a starting point of the line segment extending in said first direction and being positioned on a lowermost side of said table; and
   Th is a constant.

4. A method as claimed in claim 3, wherein one of said imaginary ruled lines on one of the sides of said table has coordinates $(Min(u_{sx}, d_{sx}), u_{sy})$ indicating the starting point thereof and the coordinates $(Max(u_{sx}, d_{sx}), d_{sy})$ indicating the end point thereof, where $Min(u_{sx}, d_{sx})$ indicates that the smaller one of the coordinates $u_{sx}$ and $d_{sx}$ is selected, and the other imaginary ruled line on the other side of said table has coordinates $(Min(u_{ex}, d_{ex}), u_{ey})$ indicating the starting point thereof and the coordinates $(Max(u_{ex}, d_{ex}), d_{ey})$ indicating the end point thereof where $Max(u_{ex}, d_{ex})$ indicates that the greater of the coordinates $u_{ex}$ and $d_{ex}$ is selected.

5. A method for recognizing a table area in a document, comprising the steps of:
   (a) extracting image data on a table are having a table from binary image data on a document;
   (b) extracting, from said image data on the table area, a line segment extending in a first direction;
   (c) extracting, from said image data on the table area, a line segment extending in a second direction perpendicular to said first direction;
   (d) determining, from said line segment extending in the first direction and said line segment extending in the second direction, whether or not ruled lines are provided on both sides of said table;
   (e) generating imaginary ruled lines on both sides of said table when it is determined that the ruled lines are provided on neither side of said table;
   (f) recognizing frames formed in said table data relating to said line segment extending in the first direction, said line segment extending in the second direction, and said ruled lines;
   (g) extracting an image from each of said frames; and
   (h) recognizing said image in each of said frames so that a character formed by said image is identified.

6. An apparatus for recognizing a table area in a document, comprising:
   first means for extracting image data on a table area having a table from binary image data on a document;
   second means, coupled to said first means, for extracting, from said image data on the table area;, a line segment extending in a first direction;
   third means coupled to said first means, for extracting, from said image data on the table area; a line segment extending in a second direction perpendicular to said first direction;
   fourth means, coupled to said second and third means, for determining, from said line segment extending in the first direction and said line segment extending in the second direction, whether or not ruled lines are provide on both sides of said table; and
   fifth means, coupled to said second, third and fourth means, for generating imaginary ruled lines on both sides of said table when it is determined that the ruled lines are provided on neither side of said table.

7. An apparatus as claimed in claim 6, further comprising:
   first memory means for storing data on said line segment extending in the first direction; and
   second memory means for storing data on said line segment extending in the second direction.

8. An apparatus as claimed in claim 6, further comprising:
   scanning means for optically scanning said document and generating said binary image data; and
   binary image memory means for storing said binary image data which is supplied to said first means.

9. An apparatus as claimed in claim 6, further comprising input means for designating said table area.

10. An apparatus as claimed in claim 9, wherein said input means includes a mouse.

11. An apparatus as claimed in claim 6, wherein said document has a predetermined format which defines said table area.

12. An apparatus for recognizing a table area in a document, comprising;
    first means for extracting image data on a table area having a table from binary image data on a document;

second means, coupled to said first means, for extracting, from said image data on the table area; a line segment extending a first direction;

third means, coupled to said first means, for extracting, from said image data on the table area;, a line segment extending in a second direction perpendicular to said first direction;

fourth means, coupled to said second and third mans, for determining, from said line segment extending in the first direction and said line segment extending in the second direction, whether or not ruled lines are provided on both sides of said table; and fifth means, coupled to said second, third and fourth means, for generating imaginary ruled lines on both side of said table when it is determined that the ruled lines are provided on neither side of said table;

wherein said fourth mans comprises:

(1) means for determining whether $|\lambda_{sx}-u_{sx}| \geq Th$; and (2) means for determining whether $|\lambda_{ex}-d_{ex}| \geq Th$;

wherein:

$(\lambda_{sx}, \lambda_{sy})$ and $(\lambda_{ex}, \lambda_{ey})$ are, respectively, coordinates of starting and end points of said line segment extending in the second direction and being positioned closes to a left side of said table;

$(u_{sx}, u_{sy})$ are coordinates of a starting point of said line segment extending in the first direction and being positioned on an uppermost side of said table;

$(d_{sx}, d_{sy})$ are the coordinates of a starting point of the line segment extending in said first direction and being positioned on a lower most side of said table; and Th is a constant.

13. An apparatus as claimed in claim 12, wherein one of said imaginary ruled lines on one of the sides of said table has coordinates $(Min(u_{sx}, d_{sx}), u_{sy})$ indicating the starting point thereof and the coordinates $(Max(u_{sx}, d_{sx}), d_{sy})$ indicating the end point thereof, where $Min(u_{sx}, d_{sx})$ indicates that the smaller of the coordinates $u_{sx}$ and $d_{sx}$ is selected, and the other imaginary ruled line on the other side of said table has coordinates $(Min(u_{ex}, d_{ex}), u_{ey})$ indicating the starting point thereof and the coordinates $(Max(u_{ex}, d_{ex}), d_{ey})$ indicating the end point thereof where $Max(u_{ex}, d_{ex})$ indicates that the greater of the coordinates $u_{ex}$ and $d_{ex}$ is selected.

14. An apparatus for recognizing a table area in a document, comprising:

first means for extracting image data on a table area having a table from binary image data on a document;

second means, coupled to said first means, for extracting, from said image data on the table area;, a line segment extending in a first direction;

third means, couple to said first means, for extracting, from said image data on the table area;, a line segment extending in a second direction perpendicular to said first direction;

fourth means, coupled to said second and third means, for determining, from said lines segment extending in the first direction and said line segment extending in the second direction, whether or not ruled lines are provided on both sides of said table; and fifth means, coupled to said second, third and fourth means, for generating imaginary ruled lines on both sides of said table when it is determined that the ruled lies are provided on neither side of said table;

means for recognizing frames formed in said table data relating to said line segment extending in the first direction, said line segment extending in the second direction, and said rule lines;

means for extracting an image from each of said frames; and means for recognizing said image in each of said frames so that a character formed by said image is identified.

* * * * *